United States Patent

[11] 3,582,907

| [72] | Inventors | George William Taylor |
| | | Princeton; |
| | | Philip Goldstein, North Brunswick, both of, N.J. |
| [21] | Appl. No. | 729,066 |
| [22] | Filed | May 14, 1968 |
| [45] | Patented | June 1, 1971 |
| [73] | Assignee | RCA Corporation |

[54] LIGHT APERTURE MATRIX
18 Claims, 3 Drawing Figs.

[52] U.S. Cl. ........................................................ 340/173LM,
350/96, 350/160, 350/267
[51] Int. Cl. ................................................................ G11c 13/04
[50] Field of Search............................................ 340/173
CM, 173 CSS; 350/3.5, 96, 160, 266, 267

[56] References Cited
UNITED STATES PATENTS

| 3,200,525 | 8/1965 | Francis......................... | 350/267 |
| 3,322,482 | 5/1967 | Harmon ....................... | 350/267 |
| 3,360,657 | 12/1967 | Shlesinger .................... | 350/96 |
| 3,412,255 | 11/1968 | Krieger......................... | 350/96 |
| 3,432,675 | 3/1969 | Roby............................. | 340/173 |
| 3,439,179 | 4/1969 | Schlesinger ................. | 340/173 |

Primary Examiner—Terrell W. Fears
Attorney—H. Christoffersen

ABSTRACT: A matrix of light controlling intersections having transparent X and Y fluid channels with fluid amplifiers controlling the flow of fluid in the channels. The fluid may be either opaque to control the transmission of incident traversing light at the matrix intersections of simple X and Y fluid conduits of transparent material to control the light transmission by affecting the interface between a prism face and a fluid surface.

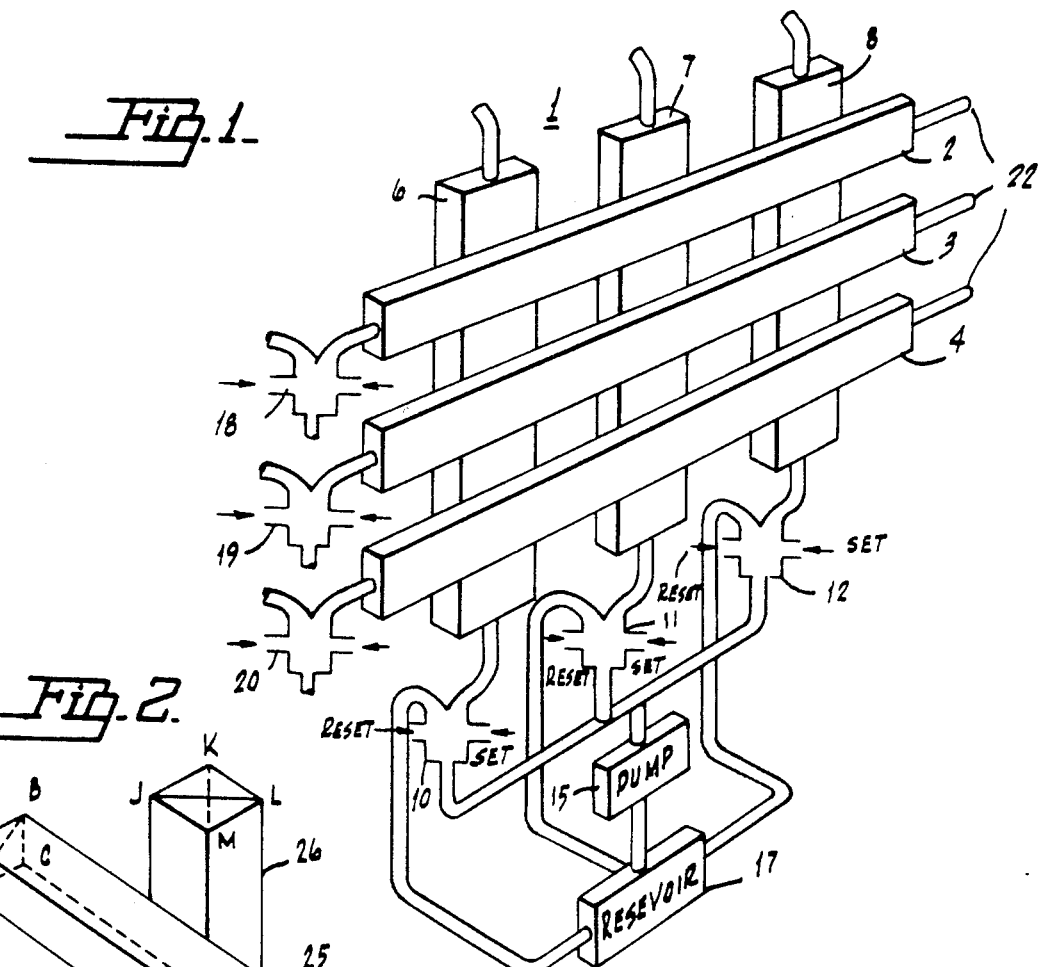
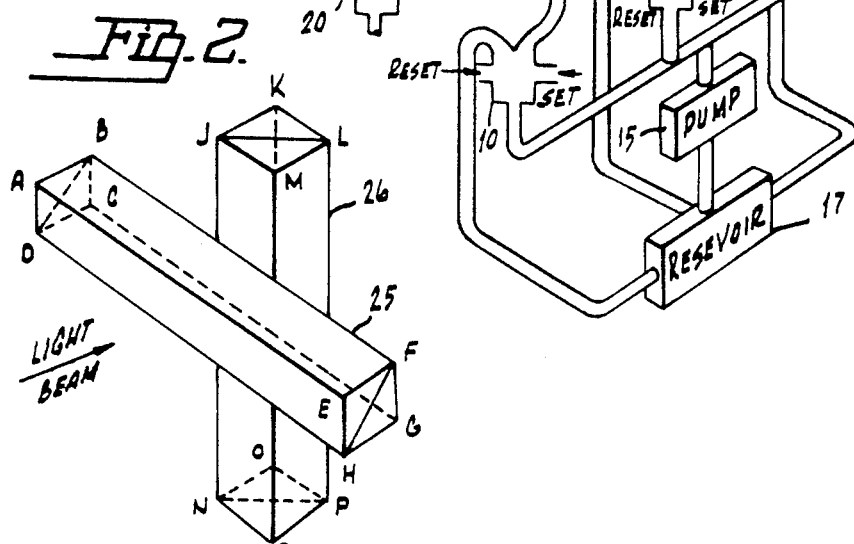
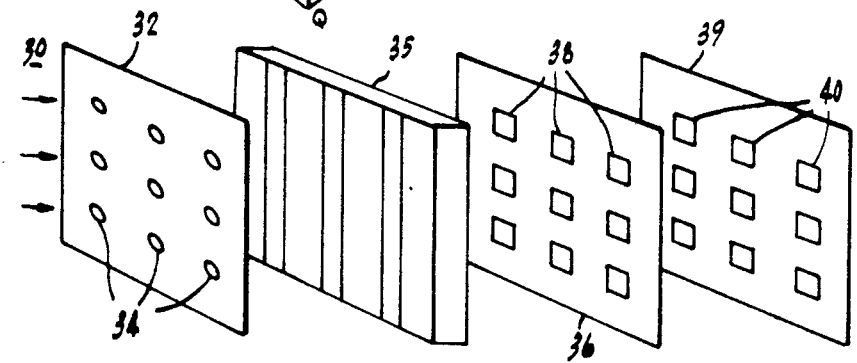

3,582,907

LIGHT APERTURE MATRIX

BACKGROUND OF THE INVENTION

Fluid logic circuits have been used extensively to perform functions such as flip-flops, AND gates, NOR gates, amplifiers, etc. Fluid logic devices have several inherent advantages including low manufacturing costs, long life, and high resistance to shock, radiation and temperature. Since the fluid used in fluid amplifiers can be arranged to have desired reflective (including scattering and absorption) and refractive properties, it can be used to control light transmission. Accordingly, it is possible to provide a light control apparatus having all of the aforesaid advantages of fluid devices and being particularly suitable for controlling coherent light.

BRIEF SUMMARY OF THE INVENTION

A first embodiment of the invention includes a light controlling matrix having transparent X and Y channels forming operative matrix intersections. An opaque fluid is selectively directed into the fluid channels by fluid amplifiers to provide a light transmitting aperture at the matrix intersection of an X and a Y channel having an interrupted fluid flow. In a second embodiment, the X and Y fluid channels are each divided into a longitudinal prism section and a fluid section. A transparent fluid having a suitable refractive index is directed into a selected X and Y channel to produce a light transmitting path at matrix intersections of the selected X and Y channels. The other intersections offer only total reflection to the incident radiation at the interfaces of the prism sections and the empty fluid sections. A hologram memory readout apparatus is shown using the light controlling matrix of the present invention for selectively directing coherent light to a selected one of a plurality of data storage holograms.

BRIEF DESCRIPTION OF THE DRAWING

FIG. 1 is a pictorial representation of one embodiment of the present invention;

FIG. 2 is a pictorial illustration of another embodiment of the present invention; and FIG. 3 is a pictorial representation of a hologram memory using the embodiments of the invention shown in FIGS. 1 and 2.

DETAILED DESCRIPTION

In FIG. 1, there is shown an exemplary illustration of a light aperture matrix 1 embodying the present invention. A plurality of parallel X-axis fluid channels, e.g., fluid channels 2, 3 and 4, are positioned in a spaced-apart flat array. Similarly, a plurality of parallel Y-axis fluid channels, e.g., fluid channels 6, 7 and 8 are positioned in a spaced-apart flat array. The array of Y-channels 6, 7 and 8 is positioned behind and parallel to the array of X-channels 2, 3 and 4 to form a matrix having a plurality of operative X and Y "intersections," e.g., nine intersections as shown in FIG. 1.

An output channel from a corresponding fluid amplifier is connected to each of the X and Y channels 2, 3, 4, 6, 7 and 8. For example, a first fluid amplifier 10 has an output channel connected to an input line of the first Y-channel 6. Similarly, a second fluid amplifier 11 is connected to a second Y-channel 7, and a third fluid amplifier 12 is connected to a third Y-channel 8. The input channels of the fluid amplifiers 10, 11 and 12 are connected in common to a fluid pump 15, drawing fluid from a common fluid reservoir 17. The X-fluid channels 2, 3 and 4 are similarly supplied from output channels of respective ones of three fluid amplifiers 18, 19 and 20. These fluid amplifiers 18, 19, 20 are, in turn, supplied by the pump 15 in a manner as described above with respect to the fluid amplifiers 10, 11, and 12. The other output channels of all the fluid amplifiers 10, 11, 12, 18, 19, and 20 are connected to the common reservoir 17. Each of the amplifiers 10, 11, 12, 18, 19 and 20 has a pair of input control channels shown as "set" and "reset" channels for the first to third amplifiers 10, 11 and 12. These input channels are connected to sources of control signals (not shown) which control the flow of fluid in the fluid amplifiers 10, 11, 12, 18, 19 and 20 in a manner well-known in the art. Accordingly, each of the fluid amplifiers can be controlled to direct a fluid into one of its output channels, i.e., to direct the fluid into a corresponding X or Y channel or into the reservoir 17. The fluid in the X and Y channels is returned to the reservoir 17 by return conduits 22.

In operation, the X and Y channels 2 to 4 and 6 to 8 are transparent to the incident radiation which is to be controlled by the matrix 1. Conversely, the fluid supplied by the pump 15 is opaque to the incident radiation which is to be controlled by the matrix 1, i.e., either reflective or absorptive. In order to permanently block the incident radiation at locations other than the matrix intersections, the X and Y channels could be coated with an opaque materials at these locations. Alternatively, an aperture plate, as discussed hereinafter, could be used to limit the incident radiation to the area of the matrix intersections. The fluid amplifiers may be of the type wherein the fluid stream is retained in one of the output channels after switching by an input signal until an input signal on the opposite side is applied to switch the fluid stream to the other output channel. For example, a "set" input signal applied to all of the fluid amplifiers 10 to 12 and 18 to 20 switches the fluid stream into all of the X and Y fluid channels 2 to 4 and 6 to 8. As a result, all of the X and Y intersections are opaque to incident radiation applied to the plane of the matrix 1. By switching a selected one of the X amplifiers 10 to 12 and one of the Y amplifiers 18 to 20 to divert the fluid streams thereof to the reservoir 17, the intersection of the corresponding X and Y channels becomes transparent to the incident radiation. Concurrently, all of the other matrix intersections remain opaque to the radiation since at least one of the X and Y channels at these intersections is carrying the opaque fluid. Thus, the matrix 1 controls the passage of the incident radiation therethrough by selectively clearing the X and Y intersections. The selected X and Y channels may be readily emptied by any suitable means. For example, the matrix 1 may be arranged to have the fluid flow in the X and Y channels be assisted by gravity which would tend to empty a channel when the corresponding fluid flow is interrupted. Another method of emptying the X and Y channels would be to introduce a momentary high pressure gas to flow by a separate gating means, e.g., additional fluid amplifiers, operated concurrently with the fluid amplifiers shown in FIG. 1.

In FIG. 2, there is shown another embodiment of the present invention suitable for use in the matrix configuration of FIG. 1. The embodiment shown in FIG. 2 is illustrated for purposes of clarity as a magnified view of a single intersection of the X and Y channels of a matrix. The fluid input means to the embodiment shown in FIG. 2 would be similar to those shown in FIG. 1 and, hence, have been omitted in this simplified illustration. An X channel 25 and a Y channel 26 are shown in FIG. 2 at a matrix intersection. The X and Y fluid channels 25 and 26 are each internally divided to form a fluid conduit section and a prism section. For example, X channel 25 has a prism section ABD–EFH and an input fluid channel section, or conduit, BCD–FGH. The prism section may either be made of the same material as the transparent outer envelope of the channel 25, e.g., glass, or it may be a hollow container permanently filled with a high refractive index liquid. Similarly, the prism section JLM–NPQ of the Y channel 26 may be constructed with either arrangement. The input fluid channel sections of the X and Y channels 25 and 26 are connected to fluid inputs as shown in FIG. 1.

However, the fluid used in the embodiment of FIG. 2 need not be opaque to the incident radiation as in the case of the fluid used in the apparatus of FIG. 1. The fluid used in FIG. 2 is used to change the reflective property of the surface of the prism sections of the channels 25 and 26 adjacent to the input fluid conduit. Thus, if the input fluid conduit of either channel 25 and 26 is filled with a suitable input fluid, the incident light beam passes through the prism section and the fluid conduit without alteration. On the other hand, if the fluid conduit is empty as a result of an interruption in the fluid flow, the incoming light beam passes through the prism section, but upon reaching the interface between the prism section and the empty fluid conduit, e.g., face BDHF in X channel 25, the light is totally reflected, i.e., bent in a 90° deviation. This internal reflection is achieved by a suitable choice of the angle of the aforesaid interface and the material of the prism section, i.e., the refractive indices of the prism and fluid are substantially identical, whereby without the fluid in the fluid conduit, the critical angle for the incoming light beam is exceeded to produce total reflection.

In order for the incoming light beam to pass through a particular X and Y channel intersection, the fluid conduits of both the corresponding X and Y channels have to be filled with the appropriate input fluid. It is to be noted that the mode of operation of a matrix using the embodiment of FIG. 2 is inverse to that of the matrix 1 shown in FIG. 1 since the fluid in the matrix 1 of FIG. 1 must be present to stop the transmission of the incident radiation through a matrix intersection. In order to further control the reflected light beam in the X and Y channels 25 and 26, the faces ABEF and LMPQ may be coated with a suitable radiation absorbing material.

In FIG. 3, there is shown a hologram memory apparatus using the embodiment of the present invention shown in FIG. 1. A source of coherent light (not shown) provides a radiation pattern 30. The radiation pattern 30 is directed to a mask 32 having a predetermined number of fixed apertures 34. The radiation pattern 30 may be either a general illumination of the surface of the mask 32 or individual beams of illumination for the region of each of the apertures 34. In either case, the mask 32 limits the light passing therethrough to the aperture area of each of the apertures 34. A light aperture matrix 35, having a structure as shown in FIG. 1 or 2, is positioned behind the mask 32 with each of the matrix intersections aligned with a respective one of the apertures 34. Next after the matrix 35, a hologram plate 36 having a plurality of data holograms 38 thereon is positioned adjacent to the matrix 35 with the holograms 38 aligned with respective ones of the intersections of the matrix 35. Finally, a plate 39 having a plurality of light sensitive elements 40, e.g., photodiodes, is positioned adjacent to the hologram plate with the elements 40 being operatively associated with the holograms 38.

In operation, the matrix 35 is used to control the selection of one of the holograms 38 by allowing the incident radiation 30 from the aperture plate 32 to pass through a selected matrix intersection and illuminate a desired one of the holograms 38. The information stored in the selected hologram is sensed by the corresponding readout elements 40 and is translated to an output signal for use by suitable associated equipment.

We claim:

1. A light control matrix comprising a plurality of operatively intersecting transparent fluid channels, each such intersection being a light path for an incident light beam which is perpendicular to the plane of intersection of said fluid channels, and a fluid control means for selectively directing a suitable fluid into said channels for selecting certain ones of said light paths for transmission of said incident light beam.

2. A light control matrix as set forth in claim 1 wherein said fluid is an opaque fluid which is effective to prevent the transmission of light through said fluid channels.

3. A light control matrix comprising a plurality of operatively intersecting fluid channels which are transparent fluid conduits, each said fluid channel being longitudinally divided into a fluid channel section and a fixed refractive index prism section, and a fluid control means for selectively directing a suitable fluid into said channels.

4. A hologram memory system comprising:
a plurality of hologram data storage elements arranged parallel to a plane;
a light control matrix positioned between said hologram elements and a source of light comprising a first group of fluid conductors formed of transparent material and lying parallel to said plane and a second group of similar fluid conductors adjacent to and also parallel to said plane, the conductors of the first group extending at an angle to those of the first group and forming therewith matrix intersections, each such intersection being aligned with a corresponding one of said hologram data storage elements; and
a fluid control means for selectively directing a suitable fluid into said channels for permitting the passage of light from said source through the two channels at only one of said intersections.

5. A hologram memory system as set forth in claim 11 wherein said fluid channels are each longitudinally divided into a fluid channel section and a fixed refractive index prism section.

6. A hologram memory system as set forth in claim 11 wherein said fluid has a refractive index substantially identical to that of said prism section.

7. In combination:
a first light deflection means which in one condition is transparent to a beam of light applied perpendicular to the direction in which it extends, and which can be changed to a second condition in which a light beam reaching said first means is reflected at an angle to said direction;
a second light deflection means having properties and structure similar to said first means, said second means having the direction in which it extends perpendicular to any light beam passed when said first means is in said one condition and being positioned to receive any such passed light beam; and
means for selectively changing the condition of said first and second means between light beam passing and light beam reflecting conditions.

8. A system for deflecting a light beam comprising, in combination:
a first light deflection means comprising a plurality of aligned stages which in one condition are all transparent to a beam of light applied to the stages along a path perpendicular to their plane of alignment, and each stage of which can be changed to a second condition in which a light beam, if it reaches said stage, is reflected at an angle to said plane;
a second light deflection means having the same properties and similar structure to said first means, said second means having its plane of alignment perpendicular to any light beam passed when said first light deflection means is in said one condition and being positioned to receive any such passed light beam; and
means for selectively changing the condition of each stage of said first and second means between light beam passing and reflecting conditions.

9. A system as set forth in claim 8, wherein each stage comprises two prisms, one solid and the other hollow and capable of being filled with fluid, the prisms being arranged surface-to-surface and together forming an element of rectangular cross section.

10. The combination claimed in claim 9, including means for adding and removing fluid from said hollow prism for changing a stage from one condition to the other.

11. A light valve matrix comprising, in combination:
a first light valve means comprising a plurality of aligned stages which in one condition are all transparent to a beam of light applied to the stages along a path perpendicular to their plane of alignment, and each stage of which can be changed to a second condition in which the stage becomes opaque thereby blocking an applied light beam;
a second light valve means having the same properties and structure as said first means, said second means having its plane of alignment positioned to receive any light beam passed when said first means is in said first condition; and means for selectively changing the condition of each stage of said first and second means between light beam passing and light beam blocking conditions.

12. A light valve matrix comprising, in combination:
a plurality of intersecting transparent fluid channels, each such intersection being a light path for an incident light beam; and
fluid control means for selectively filling or emptying said channels with an opaque fluid.

13. A matrix for controlling the passage of light comprising, in combination:
a first group of fluid channels formed of transparent material and lying adjacent and substantially parallel to one side of an imaginary plane;
a second group of fluid channels formed of transparent material and lying adjacent and substantially parallel to the other side of said plane and the channels of said second group extending at an angle to those of said first group, each region of the matrix where a fluid channel of the first group lies next to a fluid channel of the second group comprising a light valve; and
means for selectively controlling said valves to cause at least one such valve to pass light and others to block the passage of light comprising means for selectively applying fluid to said channels.

14. A matrix as set forth in claim 13, wherein said first group of fluid channels extend in one direction and said second group of fluid channels extend in a second direction at an angle of substantially 90° to the first direction.

15. A matrix as set forth in claim 13, wherein each said channel, in cross section, consists of a solid, triangularly shaped prism section of given refractive index and a triangularly shaped fluid channel section, said fluid channel section, in the absence of a fluid, having a substantially different refractive index than said solid prism section, and wherein said means for selectively controlling said valves comprises means for applying a transparent fluid of approximately the same refractive index as said solid prism section to selected channels.

16. A matrix as set forth in claim 13 wherein the region of said matrix other than that occupied by said valves is formed of an opaque material.

17. A matrix as set forth in claim 13, wherein said means for selectively controlling said valves comprises means for applying an opaque fluid to all of said channels except those leading to the valves it is desired to pass light.

18. A matrix for controlling the passage of radiant energy comprising, in combination:
a first group of fluid channels formed of material transparent to said radiant energy adjacent and substantially parallel to one side of an imaginary plane;
a second group of fluid channels formed of material transparent to said radiant energy adjacent and substantially parallel to the other side of said plane and said second channels extending at an angle to said first channels, each region of the matrix where a fluid channel of the first group lies next to a fluid channel of the second group comprising a radiant energy valve; and
means for selectively controlling said valves to cause at least one such valve to pass radiant energy and others to block the passage of radiant energy comprising means for selectively applying radiant energy affecting fluid to said channels.

UNITED STATES PATENT OFFICE
CERTIFICATE OF CORRECTION

Patent No. 3,582,907　　　　　　　　Dated June 1, 1971

Inventor(s) George William Taylor and Philip Goldstein

It is certified that error appears in the above-identified patent and that said Letters Patent are hereby corrected as shown below:

In column 2, line 44, delete ---to---.  In column 3, line 56, after "such" insert ---operative---; line 57, after "intersection" insert ---of said fluid channels---.

Signed and sealed this 25th day of January 1972.

(SEAL)
Attest:

EDWARD M. FLETCHER, JR.　　　　　　ROBERT GOTTSCHALK
Attesting Officer　　　　　　　　　Commissioner of Patents